May 27, 1969    Z. J. KISS    3,447,097
LUMINESCENT MATERIALS AND APPARATUS FOR
GENERATING COHERENT RADIATION
Filed June 28, 1965

INVENTOR.
ZOLTAN J. KISS
BY
L. Greenspan
ATTORNEY

United States Patent Office 3,447,097
Patented May 27, 1969

3,447,097
LUMINESCENT MATERIALS AND APPARATUS FOR GENERATING COHERENT RADIATION
Zoltan J. Kiss, Trenton, N.J., assignor to Radio Corporation of America, a corporation of Delaware
Continuation-in-part of abandoned application Ser. No. 197,775, May 25, 1962. This application June 28, 1965, Ser. No. 467,393
Int. Cl. H01s 3/14
U.S. Cl. 331—94.5                                    9 Claims

ABSTRACT OF THE DISCLOSURE

Luminescent material consisting essentially of an alkaline earth halide, such as calcium fluoride, containing $10^{-6}$ to $10^{-1}$ mols divalent dysprosium per mol of halide. A laser element comprised of a single crystal body of this composition having two opposed mirror surfaces thereon. A laser apparatus comprised of a laser element, a source of non-coherent radiation for exciting the element, and means for deriving coherent light from the element.

*Cross-references to related applications*

This is a continuation-in-part of application Ser. No. 197,775, filed May 25, 1962, now abandoned. Reference is also made to application Ser. No. 276,764, filed Apr. 30, 1963, by Zoltan J. Kiss. This application and the above-cited applications are assigned to the same assignee.

*Background of the invention*

This invention relates to novel luminescent materials. The invention also relates to novel elements for producing coherent radiation by stimulated emission, and to novel apparatus for producing coherent radiation.

Ideally, coherent radiation refers to a beam of radiant energy wherein all of the energy is at a single frequency and in exactly the same phase. As used herein, the term "coherent radiation" permits a small variation in frequency and phase relationship, so that the radiant energy of the beam substantially approaches the ideal definition.

Elements and apparatus for producing coherent radiation by stimulated emission are described by Vogel et al. in Electronics, Oct. 27, 1961, pages 40 to 47, and by Boyd et al. in Physical Review Letters 8, April 1, 1962, pages 269 to 272. An element for producing coherent radiation as described therein comprises a single crystal body of a luminescent material comprising a host or matrix material having particular impurity ions or dopants contained therein. The desired emission characteristics of the element result from the combination of matrix material and dopant. Apparatus for producing coherent radiation generally comprises an element, as described above, means including a source of noncoherent radiation for exciting the element, and means for deriving coherent radiation from the element.

An object of this invention is to provide novel luminescent materials.

A further object is to provide novel materials and elements for producing coherent radiation by stimulated emission.

Another object is to provide apparatus for generating coherent radiation including a novel element of the invention.

In general, the novel luminescent materials of the invention consist essentially of alkaline earth halides containing between $10^{-6}$ and $10^{-1}$ mols divalent dysprosium per mol of halide. A preferred material has the molar composition $CaF_2{:}xDy^{2+}$, where $x$ is between $10^{-6}$ and $10^{-1}$ mols. An element of the invention for producing coherent radiation by stimulated emission comprises generally a single crystal body of an alkaline earth halide containing between $10^{-4}$ and $10^{-2}$ mols divalent dysprosium per mol of halide. The body preferably has two opposed faces, one of which has a totally light-reflecting mirror adjacent thereto, and the other of which has a partially light-reflecting and partially light-transmitting mirror adjacent thereto. When excited with suitable non-coherent radiation, generally between 3,000 and 10,000 A., the element emits coherent radiation at about 2.36 microns. The apparatus of the invention comprises the foregoing element and means for exciting the element including a source of noncoherent radiation, and means for deriving the coherent radiation generated in the element.

The invention is more fully described with reference to the drawing, in which.

The luminescent material of the invention consists essentially of an alkaline earth halide host material containing between $10^{-6}$ and $10^{-1}$ mols divalent dysprosium per mol of host material. The host material may be a single alkaline earth halide or may be a homogeneous mixture of alkaline earth halides. The preferred halides are alkaline earth fluorides; for example, $CaF_2$, $BaF_2$ and $SrF_2$. Some other halides are $CaCl_2$, $CaFCl$, $CaBrI$, $BaBr_2$, $BaCaClF$, $BaFCl$, $BaFBr$, $BaClI$, $SrFI$ and $SrClBr$. The preferred material is calcium fluoride containing small amounts of divalent dysprosium (indicated by the symbol $Dy^{2+}$). This material may be described by the molar formula $CaF_2{:}xDy^{2+}$, where $x$ is between $10^{-6}$ $10^{-1}$ mols. Generally, these materials luminesce when excited with radiation in the range between 3,000 and 10,000 A., emitting noncoherent radiation in relatively narrow bands in wavelengths between 2.30 and 2.60 microns.

Calcium fluoride containing small amounts of trivalent dysprosium were known previous to this invention. In this invention, the dysprosium is in the divalent state. By incorporating divalent dysprosium in a host material, such as calcium fluoride, luminescent materials having different emission characteristics are produced.

The luminescent materials of the invention can be prepared by first preparing a host material, such as calcium fluoride, containing trivalent dysprosium and then converting the dysprosium to the divalent state. For example, calcium fluoride and a trivalent dysprosium salt are fused together and then cooled to produce calcium fluoride containing trivalent dysprosium. This product is now exposed to gamma radiation in sufficient energy (about 1 mev.) and in sufficient dosage to convert the dysprosium to the divalent state. This process is described in application Ser. No. 276,764, filed Apr. 30, 1963, by Z. J. Kiss. As another example, an alkaline earth halide, such as calcium fluoride, containing trivalent dysprosium cations is heated at between 650 and 950° C. for 0.1 to 10 hours in an atmosphere consisting essentially of the vapor of at least one alkaline earth metal, such as calcium metal in the case of a calcium fluoride host material. This process is described in application Ser. No. 356,959, filed Apr. 2, 1964 by Z. J. Kiss, now abandoned.

Figure 1:
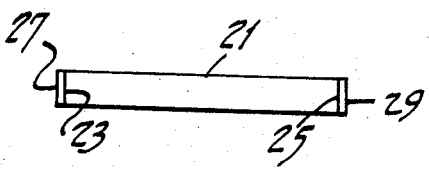
FIGURE 1, is an elevational view of a typical element of the invention.

Luminescent materials of the invention which contain $10^{-4}$ to $10^{-2}$ mols divalent dysprosium per mol of host material can be made to emit coherent radiation at about 2.36 microns with excitation by noncoherent radiation having wavelengths between 3,000 and 10,000 A. For producing coherent radiation, it is preferred to provide an element, as illustrated in FIGURE 1, comprising a single crystal body 21 of the luminescent material. The body 21 may be in the form of a rectangular parallelepiped, or a rectangular cylinder, having two opposed plane faces 23 and 25. The faces 23 and 25 are ground to be plane and parallel to one another to within a few seconds of arc. In other embodiments, the opposed faces may be of other shapes which provide suitable optical relationships for stimulating emission of coherent radiation as contemplated by the art.

A substantially totally light-reflecting mirror 27 is adjacent one of the faces 23 and a partially light-reflecting and partially light-transmitting mirror 29 is adjacent the other of the faces 25. The mirrors may be aluminum, silver, or other metal evaporated upon the faces 23 and 25; or they may be self-supporting structures placed against or spaced from the respective faces 23 and 25.

An element for producing coherent radiation by stimulated emission may be prepared as follows: Fuse one mol calcium fluoride with 0.001 mol dysprosium as a salt thereof, and then cool the fused mass to produce calcium fluoride containing trivalent dysprosium. Then grow a single crystal, preferably with a high degree of crystallinity, by any of the usual crystal growing techniques. Suitable single crystal bodies may be grown by the Bridgeman technique, either horizontal or vertical. In one application of the Bridgeman technique, a quantity of material is passed through two zones, one of which is maintained about 20° C. above the melting point of the material and the other of which is maintained at temperatures about 20° C. below the melting point of the material. A rate of travel of about 1 inch per 24 hours is adequate. Single crystal bodies may be grown by the Czochralski method. In one application of the Czochralski method, the material is maintained just above the melting point and a crystal is pulled at the rate of 0.25 inch per hour in an oxygen-free environment.

The single crystal body is then cut to the desired size and shape. Some suitable shapes are a rectangular parallelepiped 0.25 x 0.25 x 1.00 inch long, and a rectanguler circular cylinder 0.188 inch in diameter by 1.00 inch long. In either of these shapes, the opposite minor faces are polished to be plane and parallel. The cut and polished crystal body is then exposed to gamma radiation of about 1 mev. A dose of about $10^6$ to $10^7$ rads is adequate to convert the dysprosium from the trivalent to the divalent state. Some suitable sources of gamma radiation are $Co^{60}$, or spent reactor fuel elements at room temperature. Finally, silver mirrors are evaporated on the minor faces of the body. One mirror is totally reflecting and the other mirror is about 50% transmitting.

Figure 2:
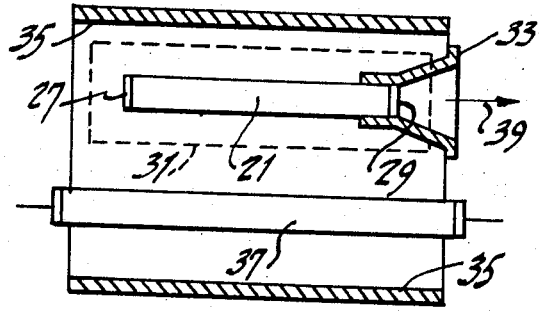
FIGURE 2 is a simplified apparatus for producing coherent radiation with the element of FIGURE 1.

FIGURE 2 illustrates a simplified apparatus for producing coherent radiation with the element of FIGURE 1. Another apparatus which may also be used is described by Boyd et al., Physical Review Letters 8, pages 269 to 272 (1962). In FIGURE 2, the element 21 is placed in a cryostat 31 or other means for maintaining the element 21 at liquid nitrogen temperatures (about 79° K.) and lower. One suitable means for maintaining the temperature is to immerse the element directly in liquid nitrogen or other liquid which boils at low temperature.

The element 21 is held in position with a holder 33 at the end of the element 21 having the partially reflecting mirror 29. The element 21 is positioned within elliptically cylindrical reflector 35 so that the longitudinal axis of the element 21 coincides with one focus of the reflector 35.

A source 37 of noncoherent radiation is positioned at the other focus of the reflector 35. The source 37 may be, for example, a xenon flash lamp (if pulse operation is desired), or a mercury arc lamp (if continuous wave operation is desired). The source 37 provides noncoherent radiation in the range of wavelengths between 3,000 and 10,000 A. The reflector 35 provides a means for focusing the noncoherent radiation from the source 37 upon the element 21. Other means may be used for this purpose. Where efficiency is not important, merely a close spacing of the source 37 to the element 21 may be sufficient to generate coherent radiation.

In operation, the source 37 is energized, either pulse or continuous, to provide noncoherent radiation incident on the element 21. When the incident noncoherent radiation is above a threshold intensity, coherent radiation is generated in the element 21 by stimulated emission. The totally reflecting mirror 27 serves to reflect coherent radiation back into the body 21. The partially transmitting mirror 29 reflects a portion of the coherent radiation back into the body 21, but also permits a portion of the coherent radiation to emerge from the body 21 in the direction shown by the arrow 39. The output may be observed by a suitable detector positioned to intercept the beam of coherent radiation.

*Example 1.*—An element including a rectangular single crystal body about 0.25 x 0.25 x 0.75 inch long of $CaF_2:0.0003Dy^{2+}$ and silver mirrors on the minor faces thereof is placed in the apparatus of FIGURE 2. The temperature of the element is reduced by immersion thereof in liquid nitrogen. An FX–100 xenon flash lamp (marketed by Edgerton, Germerhausen, and Grier, Inc., Boston, Mass.), a distance of about 1.0 inch from the body, is pulsed to emit noncoherent radiation in the desired intensity incident upon the body. An output of coherent radiation at about 2.36 microns may be observed with an electrical input power of about 1.0 joule and above to the xenon lamp.

*Example 2.*—An element including a cylindrical single crystal body about 0.188 inch in diameter by 1.0 inch long of $CaF_2:0.0007Dy^{2+}$ and silver mirrors on the minor faces thereof is placed in the apparatus of FIGURE 2. The temperature of the element is reduced by immersion thereof in liquid helium. An FX–100 xenon flash lamp, a distance of about 1.0 inch from the body, is pulsed to emit noncoherent radiation in a desired intensity incident upon the body. An output of coherent radiation at about 2.36 microns may be observed with an electrical input power of about 0.1 joule and above to the xenon lamp.

*Example 3.*—An element including a single crystal about 0.188 inch in diameter by 1.0 inch long of $CaF_2:0.002Dy^{2+}$ and silver mirrors on the minor faces thereof is placed in the apparatus of Boyd et al., op. cit. The temperature of the element is reduced by immersion thereof in liquid neon. An AH–6 mercury lamp marketed by General Electric Co., Schenectedy, N.Y. is energized to emit noncoherent radiation in a desired intensity incident on the body. An output of coherent radiation at about 2.36 microns may be observed with an electrical input power of about 500 watts and above to the mercury lamp.

*Example 4.*—Follow the procedure of Example 1 except substitute a crystal having the composition $SrF:0.0007Dy^{2+}$.

*Example 5.*—Follow the procedure of Example 1 except substitute a crystal having the composition $BaFCl:0.001Dy^{2+}$.

*Example 6.*—Follow the procedure of Example 1 except substitute a crystal having the composition $BaCl_2:0.0001Dy^{2+}$.

What is claimed is:

1. A luminescent material having the molar composition $CaF_2:xDy^{2+}$, where $x$ is between $10^{-6}$ and $10^{-1}$ mols.

2. A luminescent material having the molar composition $CaF_2:xDy^{2+}$, where $x$ is between $10^{-4}$ and $10^{-2}$ mols.

3. An element for generating coherent radiation consisting essentially of a single crystal body having the molar composition $CaF_2:xDy^{2+}$, where $x$ between $10^{-4}$ and $10^{-2}$ mols.

4. In an apparatus for generating coherent radiation comprising a single crystal body, said body having two opposed faces, a substantially totally light-reflecting mirror adjacent one of said faces, and a partially light-reflecting and partially light-transmitting mirror adjacent the other of said faces, the improvement wherein the single crystal body has the molar composition $CaF_2:xDy^{2+}$, where $x$ is between $10^{-4}$ and $10^{-2}$ mols.

5. In an apparatus for generating coherent radiation comprising a single crystal body, said body having two opposed faces, a substantially totally light-reflecting mirror adjacent one of said faces, a partially light-reflecting and partially light-transmitting mirror adjacent the other of said faces, a source of noncoherent radiation having frequencies between 3,000 and 10,000 A., means for directing said noncoherent radiation on said body, and means, including said partially light-transmitting mirror, for deriving coherent radiation from said body, the improvement wherein the single crystal body has the molar composition $CaF_2:xDy^{2+}$, where $x$ is between $10^{-4}$ and $10^{-2}$ mols.

6. A material consisting essentially of an alkaline earth halide host material having therein between $10^{-6}$ and $10^{-1}$ mols divalent dysprosium per mole of halide.

7. A material consisting essentially of an alkaline earth fluoride having therein between $10^{-6}$ and $10^{-1}$ mols divalent dysprosium per mol of fluoride.

8. In an apparatus for generating coherent radiation comprising a single crystal body, means including a source of noncoherent radiation for exciting said body, and means for deriving coherent radiation from said body, the improvement wherein the single crystal body consists essentially of an alkaline earth halide host material having therein between $10^{-6}$ and $10^{-1}$ mols divalent dysprosium per mol of halide.

9. In an apparatus for generating coherent radiation comprising a single crystal body, means including a source of noncoherent raditaion for exciting said body and means for deriving coherent radiation from said body, the improvement wherein the single crystal body consists essentially of an alkaline earth fluoride having therein between $10^{-6}$ and $10^{-1}$ mols divalent dysprosium per mol of fluoride.

References Cited

Kiss et al: Pulsed and Continuous Optical Maser Action in $CaF_2:Dy^{2+}$, Proceedings of the IRE (June 1962) pp. 1531 and 1532.

Yariv: Continuous Operation of a $CaF_2:Dy^{2+}$ Optical Maser, Proceedings of the IRE, vol. 50, No. 7 (July 1962), pp. 1699 and 1700.

Hatch et al: Hot-Pressed Polycrystalline $CaF_2:Dy^{2+}$ Laser, Appl. Phys. Letters, vol. 5, No. 8 (Oct. 15, 1964), pp. 153 and 154.

Jewell H. Pedersen, *Primary Examiner.*

W. L. SIKES, *Assistant Examiner.*

U.S. Cl. X.R.

252—301.4